United States Patent
Wipf et al.

(10) Patent No.: US 11,286,121 B2
(45) Date of Patent: Mar. 29, 2022

(54) DEVICE FOR ALIGNING PRODUCTS, MORE PARTICULARLY FOR FORMING ROWS AND/OR GROUPS OF THE PRODUCTS

(71) Applicant: Syntegon Packaging Systems AG, Beringen (CH)

(72) Inventors: Alfred Wipf, Jestetten (DE); Philipp Kathan, Schaffhausen (CH)

(73) Assignee: SYNTEGON PACKAGING SYSTEMS AG, Beringen (CH)

( * ) Notice: Subject to any disclaimer, the term of this patent is extended or adjusted under 35 U.S.C. 154(b) by 74 days.

(21) Appl. No.: 16/603,299

(22) PCT Filed: Mar. 28, 2018

(86) PCT No.: PCT/EP2018/057882
§ 371 (c)(1),
(2) Date: Oct. 7, 2019

(87) PCT Pub. No.: WO2018/184931
PCT Pub. Date: Oct. 11, 2018

(65) Prior Publication Data
US 2021/0114819 A1    Apr. 22, 2021

(30) Foreign Application Priority Data
Apr. 5, 2017   (DE) ................ 10 2017 205 773.4

(51) Int. Cl.
*B65G 47/28* (2006.01)
*B65G 47/08* (2006.01)
*B65G 47/84* (2006.01)

(52) U.S. Cl.
CPC ........... *B65G 47/28* (2013.01); *B65G 47/084* (2013.01); *B65G 47/845* (2013.01)

(58) Field of Classification Search
CPC ...... B65G 37/005; B65G 54/02; B65G 47/08; B65G 47/082; B65G 47/086; B65G 47/30;
(Continued)

(56) References Cited

U.S. PATENT DOCUMENTS 3,335,841 A * 8/1967 Klingel .................. B65B 35/24
198/460.1
4,101,020 A * 7/1978 Langen .................. B65B 35/24
198/469.1
(Continued)

FOREIGN PATENT DOCUMENTS

DE   102008040204   1/2010
DE   102011075178   11/2012
(Continued)

OTHER PUBLICATIONS

International Search Report for Application No. PCT/EP2018/057882 dated Jun. 22, 2018 (English Translation, 3 pages).

*Primary Examiner* — Joseph A Dillon, Jr.
(74) *Attorney, Agent, or Firm* — Michael Best & Friedrich LLP (57) ABSTRACT

The invention is based on a device for aligning products (14), more particularly products moved by means of a transport device (12), more particularly to form rows and/or groups of the products (14) running transverse to a main transport direction (16) of the transport device (12), having at least one aligning unit (18) having at least one alignment element (20, 22, 24) that can be introduced into a gap that exists, more particularly along the main transport direction (16), between at least two of the products (14) in order to align the products (14), and having at least one straightening drive unit (26), more particularly a linear drive unit, at least to drive the at least one alignment element (20, 22, 24), said straightening drive unit having at least one movement ele-
(Continued)

ment (28, 30, 32) that can be driven in an individually speed- and/or position-controlled manner, on which movement element the at least one alignment element (20, 22, 24; 20, 22, 24) is arranged. The invention proposes that the at least one alignment unit (20, 22, 24) can be actively moved relative to the at least one movement element (28, 30, 32) by means of an interaction with an activation unit (40) of the alignment unit (18), said activation unit more particularly having a different design from a further movement element (34, 36, 38) of the alignment drive unit (26), or that the alignment unit is arranged in an at least substantially non-movable manner on the at least one movement element (28, 30, 32).

18 Claims, 6 Drawing Sheets (58) Field of Classification Search
CPC ........ B65G 47/31; B65G 47/28; B65G 47/82; B65G 47/841; B65G 47/845; B65G 2201/02; B65G 2201/0233; B65G 2811/0631
USPC ......... 198/459.1, 459.8, 460.1, 419.2, 418.7, 198/725, 718, 728, 729; 209/917
See application file for complete search history.

(56) References Cited

U.S. PATENT DOCUMENTS

| | | | | |
|---|---|---|---|---|
| 4,134,485 A * | 1/1979 | George | ............... | B65G 47/082 198/434 |
| 5,060,783 A * | 10/1991 | Chenevard | ........... | A23G 7/0037 198/434 |
| 5,184,712 A * | 2/1993 | Leypold | ............... | B65B 35/54 198/360 |
| 6,808,062 B2 * | 10/2004 | Cerutti | ............... | B65G 47/086 198/434 |
| 7,581,637 B2 * | 9/2009 | Lenherr | ............... | B65G 19/265 198/728 |
| 8,096,409 B2 * | 1/2012 | Wipf | ............... | B65G 47/28 198/805 |
| 9,061,838 B2 * | 6/2015 | van de Loecht | ....... | B65G 47/31 |
| 9,079,724 B2 * | 7/2015 | van de Loecht | ..... | B65G 47/841 |
| 9,327,855 B2 * | 5/2016 | Hurni | ............... | B65G 47/082 |
| 10,046,923 B2 * | 8/2018 | Wagner | ............... | B65B 35/40 |
| 10,479,616 B2 * | 11/2019 | Wipf | ............... | B65G 17/24 |
| 2003/0079962 A1 * | 5/2003 | Cerutti | ............... | B65G 47/086 198/459.1 |
| 2010/0084247 A1 * | 4/2010 | Wipf | ............... | B65G 47/28 198/617 |
| 2014/0076692 A1 * | 3/2014 | van de Loecht | ....... | B65G 47/82 198/606 |
| 2014/0083817 A1 * | 3/2014 | van de Loecht | ..... | B65G 47/841 198/459.8 |
| 2014/0138212 A1 * | 5/2014 | van de Loecht | ....... | B65G 47/31 198/461.1 |
| 2015/0078876 A1 * | 3/2015 | Michler | ............... | B65H 31/3081 414/789.1 |
| 2015/0136564 A1 * | 5/2015 | Hurni | ............... | B65B 35/44 198/418 |
| 2015/0143777 A1 * | 5/2015 | Rapp | ............... | B65B 43/39 53/131.4 |
| 2015/0217886 A1 * | 8/2015 | Blanz | ............... | B65H 31/309 198/418.9 |
| 2015/0321857 A1 * | 11/2015 | Sacchetti | ............... | B65B 35/405 198/419.2 |
| 2016/0289010 A1 * | 10/2016 | Wipf | ............... | B65G 47/681 |
| 2017/0369254 A1 * | 12/2017 | Muller | ............... | B65G 47/32 |
| 2018/0257871 A1 * | 9/2018 | Wipf | ............... | B65G 17/24 |
| 2019/0100387 A1 * | 4/2019 | Hayashi | ............... | B65B 35/24 |
| 2021/0114818 A1 * | 4/2021 | Begin | ............... | B65G 47/845 |

FOREIGN PATENT DOCUMENTS

| | | |
|---|---|---|
| EP | 1300351 | 4/2003 |
| EP | 2851322 | 3/2015 |
| WO | 2014108287 | 7/2014 |
| WO | 2014195398 | 12/2014 |
| WO | 2016102117 | 6/2016 |

* cited by examiner

DEVICE FOR ALIGNING PRODUCTS, MORE PARTICULARLY FOR FORMING ROWS AND/OR GROUPS OF THE PRODUCTS

BACKGROUND OF THE INVENTION

A device for aligning products, particularly products that are moved by means of a transport device, particularly for forming from the products rows and/or groups that run transversely to a main transportation direction of the transport device, is already known from WO 2016/102117 A1, wherein the known device comprises an alignment unit which has at least one alignment element which for aligning the products is capable of being incorporated in a gap that exists between at least two of the products, and an alignment drive unit which for driving the at least one alignment element has at least one motion element which is capable of being individually driven in a speed-regulated and/or position-regulated manner and on which the at least one alignment element is disposed. As a result of the motion element interacting with a further motion element of the alignment drive unit, the at least one alignment element in the case of the known device is actively movable relative to the at least one motion unit.

SUMMARY OF THE INVENTION

The invention proceeds from a device for aligning products, particularly products that are moved by means of a transport device, particularly for forming from the products rows and/or groups that run transversely to a main transportation direction of the transport device, having at least one alignment unit which has at least one alignment element which for aligning the products is capable of being incorporated in a gap that exists particularly along the main transportation direction between at least two of the products, and having at least one alignment drive unit, particularly a linear drive unit, which at least for driving the at least one alignment element has at least one motion element which is capable of being individually driven in a speed-regulated and/or position-regulated manner and on which the at least one alignment element is disposed.

It is proposed that the at least one alignment element by means of interacting with an activation unit of the alignment unit is actively movable relative to the at least one motion element, said activation unit being particularly configured so as to be different from a further motion element of the alignment drive unit, or is disposed so as to be at least substantially immovable on the at least one motion element. The activation unit can have a groove-shaped guide track, for example, which interacts with at least one cam of the activation unit that is disposed on the alignment element, can be configured as a separate drive unit such as, for example, as a magnetic drive unit, as an electric-motor unit, as a pneumatic drive unit, or the like, which is disposed on the at least one motion element and/or on the alignment drive unit, or as another activation unit that appears expedient to a person skilled in the art. The activation unit is particularly preferably configured differently from a scissor-joint mechanism which for moving the alignment element interacts with at least two motion elements of the alignment drive unit which are particularly disposed behind one another on a common guide track. The at least one alignment element is preferably configured as an alignment ruler, as an alignment rail, as an alignment appendage, or the like. The at least one alignment element for moving in to the gap that exists between at least two of the products is preferably mounted so as to be movable on the at least one motion element and when required is capable of being actively moved for incorporating in to the gap by means of the activation unit. The at least one alignment element in at least one design embodiment of the device according to the invention can preferably be actively movable relative to the motion element in a manner substantially independent of a drive movement of the at least one motion element, particularly in the case of a design embodiment of the activation unit having a drive unit for moving the at least one alignment element, said drive unit being disposed on the at least one motion element. Alternatively, the at least one alignment element is preferably disposed so as to be locationally fixed, particularly a rigid, on the at least one motion element. In the case of an alternative disposal of the at least one alignment element on the at least one motion element the at least one alignment element is capable of being incorporated into the gap as a result of travelling through an arc of a guide track of the guide unit of the alignment drive unit. It is also conceivable that the at least one alignment element is capable of being at least partially incorporated into the gap as a result of travelling through an arc of a guide track of a guide unit of the alignment drive unit and by means of the activation unit, in particular when reaching an alignment portion of the guide track, is capable of being actively moved further into the gap, particularly as a result of a movement of the at least one alignment element relative to the at least one motion element.

Rows and/or groups that run transversely, particularly at least substantially perpendicularly, to the main transportation direction of the transport device are preferably capable of being formed from the products by means of the at least one alignment element from largely disorganized individual products that are moved by means of the transport device. The products can be continuously supplied by means of the transport device and by means of the device for example be capable of being aligned as single rows, double rows, or multiple rows, which are capable of being continuously transported away by means of the transport device. It is also conceivable that the products are continuously supplied by means of the transport device and, particularly after aligning by means of the device, are capable of being transported away in an intermittent manner. It is likewise conceivable that the products, particularly in non-aligned row patterns, are supplied on plates, said plates being unloaded by means of the device and the products herein being aligned, wherein an intermittent input of products and the continuous output of products is particularly implementable at the transport device. Furthermore conceivable is an incoming supply of batches of rows at an entry of the transport device, and an outer transportation of individual rows at a constant spacing at the exit of the transport device. Further supply and/or outward transport processes of products that appear expedient to a person skilled in the art are likewise conceivable. The device is preferably part of a production and/or packaging machine and/or part of a production and/or packaging system. The transport device by means of which products are capable of being moved and/or transported along the main transportation direction is preferably part of the production and/or packaging machine. The device is preferably provided for aligning disorganized products, particularly disorganized products of a product carpet disposed on a conveyor element, so as to form from the products rows and/or groups that run(s) transversely to a main transportation direction of the transport device. The device, when viewed along a direction that runs so as to be at least substantially perpendicular to the main transportation direction, is preferably disposed on a side of the transport device that faces away from a floor mounting face of the transport device, in particular so as to be above the transport device. However, it is also conceivable that the device, when viewed along a direction that runs so as to be at least substantially perpendicular to the main transportation direction, is disposed laterally beside the transport device. In the case of a lateral disposal of the device, the at least one alignment element is preferably disposed on the at least one motion element in such a manner that the at least one alignment element is capable of being incorporated in a gap between at least two products as a result of a pivoting movement and/or of a linear movement. The term "substantially perpendicular" herein is intended to particularly define an alignment of a direction relative to a reference direction, wherein the direction and the reference direction, particularly when viewed in a plane, enclose an angle of 90°, and the angle has a maximum deviation of particularly less than 8°, advantageously less than 5°, and particularly advantageously less than 2°.

A "product" is particularly intended to be understood as an object to be packed, particularly a non-packed object, or a pack which contains at least one object or is empty, such as, for example, a carton, a container, a tray, a biscuit, chocolate bar, a film packaging such as, for example, a tubular bag, or the like. The products can have any product shape that appears expedient to a person skilled in the art such as, for example, a product shape that is configured so as to be round, oval, polygonal, or the like.

The at least one motion element is preferably configured as a mover of the alignment drive unit, said motion element being capable of being individually driven in a speed-regulated and/or position-regulated manner. The alignment drive unit preferably comprises a multiplicity of motion elements, particularly movers, which are capable of being individually driven, particularly in a mutually independent manner, in a speed-regulated and/or position-regulated manner. The alignment drive unit preferably comprises at least the guide unit on which the at least one motion element, particularly all motion elements, of the alignment drive unit are mounted so as to be movable. The guide unit is preferably configured as a closed loop. The guide unit preferably forms a continuous guide track for a multiplicity of motion elements of the alignment drive unit that are disposed on the guide unit. The multiplicity of motion elements is preferably movable in a revolving manner along the guide track. The guide track can have an oval, a round, an elliptic, or any other inherently closed profile that appears expedient to a person skilled in the art. However, it is also conceivable that the guide unit has another design embodiment that appears expedient to a person skilled in the art such as, for example, a design embodiment having a finite profile of the guide track, said profile potentially being configured so as to be, for example, straight, meandering, curved, or the like. In the case of a finite profile of the guide track, at least one motion element that is disposed on the guide unit is movable, for example, from one end of the guide track to a further end of the guide track, in particular in a reciprocating manner. The conveying unit is preferably configured in such a manner that a movement of the multiplicity of motion elements is performed by means of a magnetic, particularly electromagnetic, design embodiment of the alignment drive unit.

The device preferably comprises at least one electromagnetic alignment drive unit for moving the at least one motion element, particularly the multiplicity of motion elements, along the guide track of the guide unit. However, it is also conceivable that the multiplicity of motion elements are movable by means of an otherwise configured drive unit such as, for example, by means of an air cushion drive unit or the like. The alignment drive unit is advantageously configured as a linear drive unit, particularly as a linear motor system. The linear motor system preferably at least along the guide track of the guide unit comprises a stator and a multiplicity of translators which are capable of being driven in an independent manner and which are provided for driving the motion elements in a mutually independent manner. "Provided" is intended to particularly mean specially programmed, conceived, and/or equipped. That an object is provided for a specific function is particularly intended to mean that the object fulfils and/or carries out said specific function in at least one application and/or operating state.

A "linear motor system" in this context is to be understood to be a system which has at least one stator and a multiplicity of translators which are capable of being driven and moved along the stator. The stator can extend along a straight line, but also along a curve and/or a circular track. The stator preferably follows the guide track of the guide unit. The stator can be configured as a secondary part, preferably as the primary part, of the linear motor system. The stator preferably has stator coils which at least in portions are capable of being independently actuated. A travelling magnetic field can be independently generated for each translator that is situated in the region of influence of the stator. The translators can be independently driven. The translators can be configured as primary parts, preferably a secondary parts, of the linear motor system. The translators preferably have permanent magnets. The translators can be configured so as to be passive. Moving lines for conducting a current to the translators can be dispensed with. The linear motor system preferably has distance and/or position measuring means which are provided for measuring the positions and/or speeds of the translators relative to the stator. A control unit of the alignment drive unit is preferably provided for controlling and/or regulating the position and/or the speed of the translators. Such linear motor systems having translators capable of being independently driven are known to the person skilled in the art, for example from WO 2016/102117 A1. At least two translators are particularly disposed on at least one motion element.

One translator is in each case preferably provided for driving one motion element. A multiplicity of translators can be capable of being independently driven along the stator. Mechanical and/or electrically moved means such as particularly cables and/or drive belts or drive chains for driving the translators can be dispensed with. A plurality of stators can be disposed beside one another along a section, preferably so as to be perpendicular to the main transportation direction. The stators can in each case be provided for driving a part-quantity of the translators of the section. The translators along the main transportation direction can preferably be assigned in an alternating manner to one of the stators. A minimum spacing of the translators to be maintained in the main transportation direction can be reduced. The translators can particularly be disposed beside one another so as to be perpendicular to the main transportation direction so that the translators can overlap in the main transportation direction. It is furthermore also conceivable that the translators are disposed on top of one another, or the translators are configured so as to be separate from the at least one motion element and/or are disposed in a drive track that is disposed so as to be parallel to the guide track, so as to drive the motion elements which are disposed so as to be movable on the guide track. In an alternative design embodiment, a plurality of translators, particularly two translators, can be provided for driving the at least one motion element. The at least one motion element can particularly be configured in multiple parts, and the translators disposed on at least one motion element can drive different parts of the at least one motion element. The translators can drive a mutually relative movement of parts of the at least one motion element. The translators can be mounted on guide means so as to be independent of the motion elements. A track along which the translators are moved can deviate from the guide track along which the motion elements are moved. The translators can preferably be disposed or mounted on the motion elements. Guide means for mounting the translators can be dispensed with. Translators that are formed by permanent magnets can preferably be fixedly connected to the motion elements. At least two permanent magnets are preferably disposed on one motion element. However, it is also conceivable that a number of permanent magnets that deviates from two is disposed on a single motion element.

By means of the design embodiment according to the invention, a precise alignment from disorganized products, particularly within a production process of a production and/or packaging machine, can advantageously be implemented for forming from the products rows and/or groups that run transversely to the main transportation direction of the transport device. Uniform row spacings between individual rows of products can advantageously be enabled. An individual adaptation of individual row spacings between individual rows of products can advantageously be achieved in a simple manner in terms of construction. A buffer function, for example for enabling an accumulation of individual rows in order for a uniform distribution of rows to be generated, can advantageously be implemented. An advantageous conjoint movement of the at least one alignment element with the products that are moved by means of the transport device can be achieved.

It is furthermore proposed that the device comprises at least one sensor at least for detecting at least one gap that exists between at least two of the products, wherein the at least one alignment element and/or the at least one motion element are/is movable as a function of the detected gap. A "sensor unit" is particularly be understood to be a unit which is provided for receiving at least one parameter and/or a physical property, wherein the reception can take place actively, such as particularly by generating and emitting an electric measuring signal, and/or passively such as particularly by detecting variations in the properties of a sensor component. Various sensor units that appear expedient to the person skilled in the art are conceivable. The sensor unit can be configured, for example, as an opto-electronic sensor unit, particularly a light-beam sensor unit, or the like. The sensor unit preferably comprises at least one sensor element, particularly an Opto-electronic sensor element, such as a light beam, for example, or the like, for detecting at least one gap that exists between at least two of the products. The sensor unit can at least in part be disposed on the alignment drive unit, on the guide unit, and/or on the transport device. At least one sensor element of the sensor unit can particularly be disposed on the guide unit and/or on the transport device. However, it is also conceivable that the sensor unit is at least in part disposed on the at least one motion element and/or on the at least one alignment element. At least one sensor element of the sensor unit can particularly be disposed on the at least one motion element and/or on the at least one alignment element. Further disposals of the sensor unit, particularly of at least one sensor element of the sensor unit, that appear expedient to a person skilled in the art are likewise conceivable. The device preferably comprises at least one control and/or regulating unit which is provided for controlling and/or regulating a movement of the at least one motion element and/or of the at least one alignment element as a function of a gap between at least two of the products that is detected by means of the sensor unit. The at least one alignment element is preferably movable into the gap as a result of a detection of a gap between at least two of the products. A movement of the at least one alignment element into a gap in the absence of a detection of a gap, in particular of a gap of more than 5 mm, preferably of more than 10 mm, and particularly preferably of more than 15 mm, between at least two of the products is preferably capable of being suppressed by means of the control and/or regulating unit. A reliable movement of the at least one alignment element into a gap that exists between at least two of the products can be advantageously achieved by means of the design embodiment according to the invention. An advantageous formation of rows and/or groups of products from a disorganized product carpet can be implemented. A precise alignment of disorganized products, particularly within a production process of production and/or packaging machine, for forming from the products rows and/or groups that run transversely to the main transportation direction of the transport device can advantageously be implemented.

It is furthermore proposed that the at least one alignment element is mounted on the at least one motion element so as to be movable in a translatory and/or rotary, particularly pivotable, manner. The device preferably comprises at least one bearing unit, particularly a linear bearing unit and/or a pivot bearing unit by means of which the at least one alignment element is mounted so as to be movable on the at least one motion element. A movement axis of the at least one alignment element in the case of a mounting of the at least one alignment element on the at least one motion element so as to be movable in a translatory and/or rotary, particularly pivotable, manner preferably runs transversely, particularly so as to be at least substantially perpendicular, to the main transportation direction. The movement axis of the at least one alignment element in the case of a mounting of the at least one alignment element on the at least one motion element so as to be movable in a rotary, particularly pivotable, manner preferably runs so as to be at least substantially perpendicular to a movement plane of the at least one motion element. The movement plane is preferably defined by a profile of the guide track of the guide unit. A movement axis of the at least one alignment element in the case of a mounting of the at least one alignment element on the at least one motion element so as to be movable in a translatory manner preferably runs so as to be at least substantially parallel to the movement plane of the at least one motion element. "Substantially parallel" herein is particularly intended to be understood as an alignment of a direction relative to a reference direction, particular in a plane, wherein the direction in relation to the reference direction has a deviation of particularly less than 8°, advantageously less than 5°, and particularly advantageously less than 2°. The activation unit for moving the at least one alignment element relative to the at least one motion element is preferably provided so as to interact with the bearing unit. The bearing unit preferably comprises at least one bearing pin element by means of which the at least one alignment element is movably mounted so as to be pivotable on the at least one motion element. The activation unit particularly comprises at least one appendage which is configured as a cam and which in at least one position of the at least one motion element and/or of the at least one alignment element engages in a guide rail or a guide track of the activation unit. The guide rail or the guide track is preferably configured as a curved track. However, it is also conceivable that at least one drive element such as, for example, an electric motor, a magnetic drive, or the like, which is provided for actively moving the at least one alignment element relative to the motion element is disposed on the at least one motion element. Further design embodiments of a mounting and/or of a drive of the at least one alignment element that appear expedient to a person skilled in the art for moving the at least one alignment element relative to the at least one motion element are likewise conceivable. A movement potential of the at least one alignment element into a gap that exists between at least two of the products can advantageously be achieved in a simple manner in terms of construction by means of the design embodiment according to the invention. An advantageous formation of rows and/or groups of products from a disorganized product carpet can be implemented. A precise alignment of disorganized products, particularly within a production process of a production and/or packaging machine, for forming from the products rows and/or groups that run transversely to the main transportation direction of the transport device can advantageously be implemented.

It is furthermore proposed that the alignment unit has a multiplicity of alignment elements which are disposed so as to be movable on the at least one motion element. More than one alignment element, particularly more than two alignment elements, of the alignment unit are preferably disposed on the at least one motion element. The multiplicity of alignment elements is preferably movable along the guide track of the guide unit by means of the at least one motion element. A high efficiency can advantageously be enabled by means of the design embodiment according to the invention. A plurality of alignment elements per motion element, particularly per motion element pair, can advantageously be disposed so as to be movable on the guide unit so as to particularly enable a small number of motion elements for moving the alignment elements along the guide track of the guide unit. Costs can advantageously be saved since a multiplicity of alignment elements are movable along the guide track of the guide unit by means of a small number of motion elements. An advantageous formation of rows and/or groups of products from a disorganized product carpet can be implemented. A precise alignment of disorganized products, particularly within a production process of a production and/or packaging machine, for forming from the products rows and/or groups that run transversely to the main transportation direction of the transport device can advantageously be implemented.

It is moreover proposed that the alignment elements that are disposed on the at least one motion element are capable of being moved individually and/or collectively. The alignment elements which are disposed on the at least one motion element are preferably mounted on the at least one motion element so as to be movable relative to the at least one motion element in a mutually independent and/or collective manner, particularly mounted so as to be movable in a translatory and/or rotary, particularly pivotable, manner. The alignment unit preferably comprises a motion coupling unit which is provided for moving the multiplicity of alignment elements which are disposed on the at least one motion element relative to the at least one motion element in a mutually independent and/or collective manner. It is particularly conceivable that the device has individual drive units which are provided for moving individual alignment elements of the multiplicity of alignment elements which are disposed on the at least one motion element relative to the at least one motion element in a mutually independent manner. Alternatively or additionally, it is conceivable that the device has at least one coupling drive unit which is provided for moving a multiplicity of alignment elements which are disposed on the at least one motion element relative to the at least one motion element in a collective manner, such as, for example, by means of the connection of the multiplicity of alignment elements by means of a gear-coupling mechanism, a rod-coupling mechanism, or the like. A plurality of alignment elements per motion element, particularly per motion element pair, can advantageously be moved individually and/or collectively by means of the design embodiment according to the invention, so as to enable a high flexibility of the device. A high efficiency can advantageously be enabled. A plurality of alignment elements per motion element, particularly per motion element pair, can advantageously be disposed so as to be movable on the guide unit so as to particularly enable a small number of motion elements for moving the alignment elements along the guide track of the guide unit. Costs can advantageously be saved since a multiplicity of alignment elements are movable along the guide track of the guide unit by means of a small number of motion elements. An advantageous formation of rows and/or groups of products from a disorganized product carpet can be implemented. A precise alignment of disorganized products, particularly within a production process of a production and/or packaging machine, for forming from the products rows and/or groups that run transversely to the main transportation direction of the transport device can advantageously be implemented.

It is furthermore proposed that the at least one alignment element, particularly each alignment element, of the alignment unit is assigned fewer than four, particularly at most two, motion elements of the alignment drive unit. The at least one alignment element or the multiplicity of alignment elements which is/are disposed on the at least one motion element is/are preferably assigned at least one further motion element. The at least one alignment element by way of one end is preferably disposed on the at least one motion unit and by way of at least one further end is disposed on at least one further motion element of the alignment drive unit. The at least one alignment element is particularly assigned at most two motion elements of the alignment drive unit for moving along the guide track of the guide unit. The at least one motion element and the at least one further motion element preferably form a motion element pair which is provided for moving the alignment element along the guide unit. The alignment drive unit preferably comprises a multiplicity of motion element pairs, wherein each motion element pair is assigned at least one alignment element or a multiplicity of alignment elements. Costs can advantageously be saved by means of the design embodiment according to the invention since a multiplicity of alignment elements are movable along the guide track of the guide unit by means of a small number of motion elements. An advantageous formation of rows and/or groups of products from a disorganized product carpet can be implemented. A precise alignment of disorganized products, particularly within a production process of a production and/or packaging machine, for forming from the products rows and/or groups that run transversely to the main transportation direction of the transport device can advantageously be implemented.

It is furthermore proposed that the alignment drive unit, particularly the guide unit, has at least one, particularly continuous, guide track which has at least one arc, wherein the at least one alignment element as a function of a movement of the at least one motion element along the arc is capable of being incorporated into a gap that exists between at least two of the products. The at least one alignment element and/or the multiplicity of alignment elements, particularly in at least one design embodiment of the device, are/is disposed so as to be immovable on the at least one motion element such that a movement of the at least one alignment element and/or of the multiplicity of alignment elements into a gap that exists between at least two of the products is performed as a function of a movement of the at least one motion element along the arc, particularly as a function of a curved travel of the at least one motion element. A saving in terms of motion mechanisms for moving the at least one alignment element into a gap which are additionally disposed on the at least one motion element can advantageously be achieved by means of the design embodiment according to the invention. Costs can advantageously be saved.

The invention furthermore proceeds from a method for aligning products, particularly for forming from the products rows and/or groups that run transversely to a main transportation direction, particularly by means of a device according to the invention. It is proposed that in at least one method step for moving at least one alignment element of an alignment unit into a gap that exists between at least two of the products the at least one alignment element by means of interacting with an activation unit, particularly configured so as to be different from a further motion element of an alignment drive unit, is actively moved relative to at least one motion element of the alignment drive unit in particular on which the at least one alignment element is disposed, or the at least one alignment element, as a function of a movement of the at least one motion element along an arc of a guide track of the alignment drive unit, is moved into the gap that exists between at least two of the products. A precise alignment of disorganized products, particularly within a production process of a production and/or packaging machine, for forming from the products rows and/or groups that run transversely to the main transportation direction of the transport device can advantageously be implemented by means of the design embodiment according to the invention. Uniform row spacings between individual rows of products can advantageously be enabled. An individual adaptation of individual row spacings between individual rows of products can advantageously be achieved in a simple manner in terms of construction. A buffer function, for example for enabling an accumulation of individual rows in order for a uniform distribution of rows to be generated, can advantageously be implemented. An advantageous conjoint movement of the at least one alignment element with the products that are moved by means of the transport device can be achieved.

It is moreover proposed that in at least one method step the at least one gap that exists between at least two of the products is detected by means of at least one sensor unit. It is furthermore proposed that in at least one method step the at least one alignment element and/or the at least one motion element are/is moved as a function of the detected gap. A reliable movement of the at least one alignment element into a gap that exists between at least two of the products can advantageously be achieved by means of the design embodiment according to the invention. An advantageous formation of rows and/or groups of products from a disorganized product carpet can be implemented. A precise alignment of disorganized products, particularly within a production process of a production and/or packaging machine, for forming from the products rows and/or groups that run transversely to the main transportation direction of the transport device can advantageously be implemented.

The device according to the invention and/or the method according to the invention herein are/is not intended to be limited to the application and embodiment described above. The device and/or the method according to the invention, in order to fulfil a functional mode described herein can particularly have a number of individual elements, components, and units as well as method steps that deviates from a number mentioned herein. Moreover, in the value ranges indicated in this disclosure, values lying within the limits mentioned are also intended to be considered to be disclosed and usable in an arbitrary manner. Moreover, all features which are disclosed in terms of the device according to the invention are also be considered disclosed in the context of the method according to the invention, and vice versa.

BRIEF DESCRIPTION OF THE DRAWINGS

Further advantages are derived from the following description of the drawing. An exemplary embodiment of the invention is illustrated in the drawing. The drawing, the description, and the claims include numerous features in combination. The person skilled in the art will expediently also consider the features individually and combine said features so as to form meaningful further combinations.

In the drawing.

DETAILED DESCRIPTION

Figure 1:
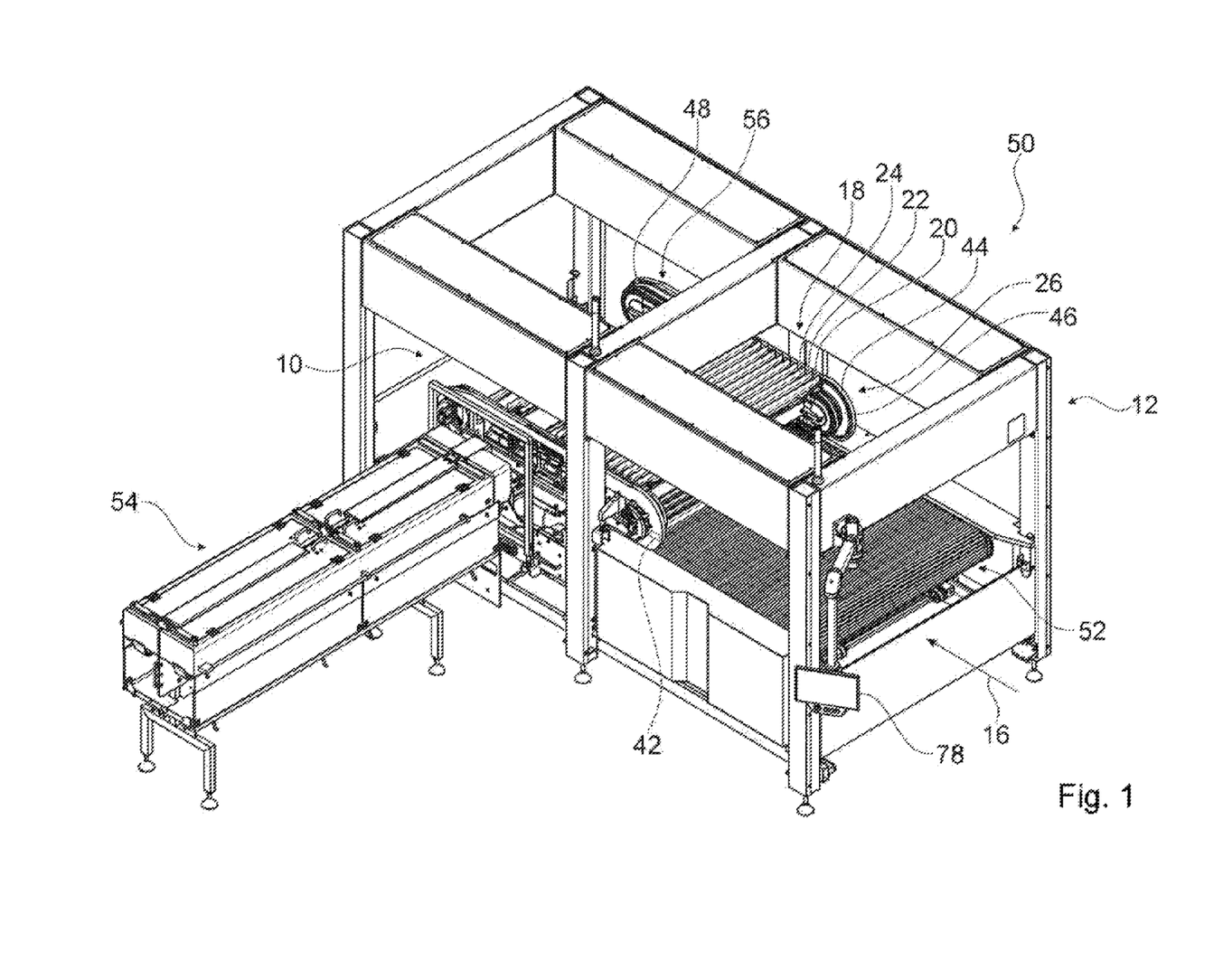
FIG. 1 shows a production and/or packaging machine having at least one device according to the invention, in a schematic illustration.
Figure 2:
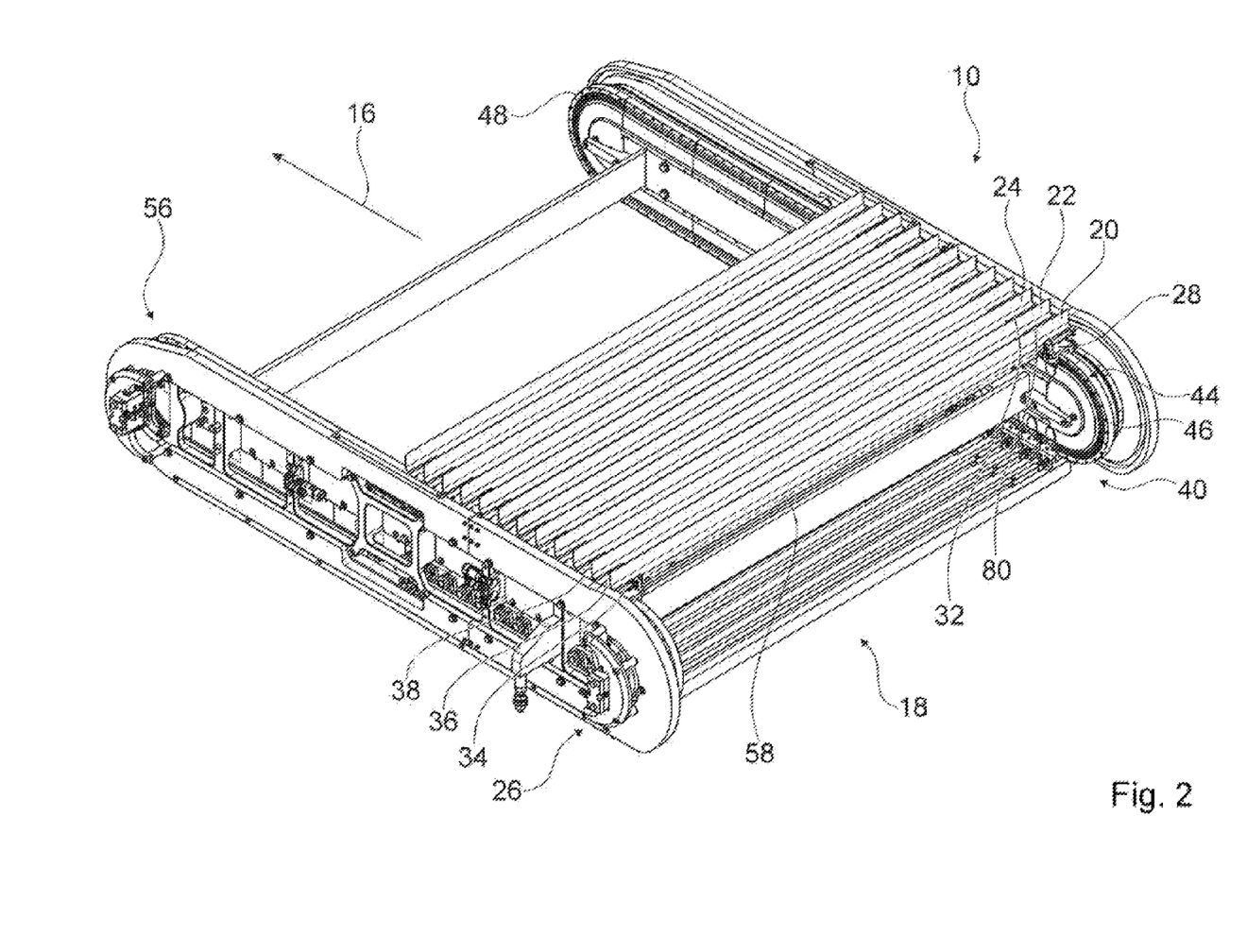
FIG. 2 shows a detailed view of the device according to the invention, in a schematic illustration.

FIG. 1 shows a production and/or packaging machine 50 having at least one transport device 12 and having at least one device 10 for aligning products 14, particularly products 14 that are moved by means of the transport device 12 (cf. FIGS. 4 to 8). The device 10 at least in part spans the transport device 12, particularly when viewed along a direction that runs transversely, particularly so as to be at least substantially perpendicular, to a main transportation direction 16 of the transport device 12. The transport device 12 has at least one supply unit 52, particularly at least one supply conveyor belt, for supplying products 14, particularly disorganized products 14, to the device 10. The products 14 for forming from the products 14 rows and/or groups that run transversely to the main transportation direction 16 of the transport device 12 are preferably capable of being supplied as a disorganized product carpet to the device 10 by means of the supply unit 52. The transport device 12 furthermore has at least one discharge unit 54, particularly a transverse discharge unit, at least for discharging products 14 that are aligned by means of the device 10. The products 14 by means of the discharge unit 54 are preferably capable of being transported onward as rows and/or groups that are formed by means of the device 10. The products 14 that are discharged from the device 10 by means of the discharge unit 54 are preferably capable of being supplied for further processing to a further production process of the production and/or packaging machine 50, such as a packaging process or the like, for example.

The device 10 for aligning products 14, particularly products 14 that are moved by means of the transport device 12, particularly for forming from the products 14 rows and/or groups that run transversely to the main transportation direction 16 of the transport device 12, comprises at least one alignment unit 18 which has at least one alignment element 20, 22, 24 which for aligning the products 14 is capable of being incorporated in a gap that exists particularly along the main transportation direction 16 between at least two of the products 14 (cf. FIGS. 4 to 8). The device 10 furthermore comprises at least one alignment drive unit 26, particularly a linear drive unit, which at least for driving the at least one alignment element 20, 22, 24 has at least one motion element 28, 30, 32 which is capable of being individually driven in a speed-regulated and/or position regulated manner and on which the at least one alignment element 20, 22, 24 is disposed. The at least one alignment element 20, 22, 24 is preferably configured as an alignment ruler. The at least one alignment element 20, 22, 24 is mounted on the at least one motion element 28, 30, 32 so as to be movable in a translatory and/or rotary, particularly pivotable, manner. A movement axis 58 of the at least one alignment element 20, 22, 24 preferably runs so as to be transverse, particularly so as to be at least substantially perpendicular, to the main transportation direction 16. The movement axis 58 of the at least one alignment element 20, 22, 24 in the case of a mounting of the at least one alignment element 20, 22, 24 on the at least one motion element 28, 30, 32 so as to be movable in a rotary, particularly pivotable, manner preferably runs so as to be at least substantially perpendicular to a movement plane of the at least one motion element 28, 30, 32 (cf. FIGS. 2, and 4 to 8). The movement plane is preferably defined by a profile of at least one guide track 44 of the guide unit 56 of the alignment drive unit 26. The guide unit 56 particularly comprises at least two guide tracks 44 which are disposed on sides of the device 10 that face away from one another and which are mutually spaced apart, particularly when viewed along a direction that runs so as to be at least substantially perpendicular to the main transportation direction 16. However, it is also conceivable that the guide unit 56 has only one single guide track 44 on which the motion elements 28, 30, 32, 34, 36, 38 are disposed so as to be movable so as to move alignment elements 20, 22, 24 at least relative to the transport device 12 for aligning products 14. A multiplicity of motion elements 28, 30, 32 of the alignment drive unit 26 that are capable of being individually driven in a speed-regulated and/or position-regulated manner are in each case disposed on the guide tracks 44 of the guide unit 56. A movement axis 58 of the at least one alignment element 20, 22, 24, in the case of a mounting of the at least one alignment element 20, 22, 24 on the at least one motion element 28, 30, 32 so as to be movable in a translatory manner, preferably runs so as to be at least substantially parallel to the movement plane of the at least one motion element 28, 30, 32. Alternatively, the at least one alignment element 20, 22, 24 is disposed so as to be substantially immovable on the at least one motion element 28, 30, 32 (indicated by dashed lines in a part-region of the device 10 in FIG. 5). In the case of the alternative, at least substantially immovable, disposal of the at least one alignment element 20, 22, 24 on the at least one motion element 28, 30, 32, the alignment drive unit 26 preferably comprises at least the, particularly continuous, guide track 44 which has at least one arc 46, 48, wherein the at least one alignment element 20, 22, 24 is capable of being incorporated into the gap that exists between at least two of the products 14 as a function of a movement of the at least one motion element 28, 30, 32 along the arc 46, 48. The at least one alignment element 20, 22, 24 is particularly capable of being moved into a gap between at least two products 14, or is capable of being moved out of a gap between at least two products 14, as a result of travelling through the arc 46, 48 of the guide track 44 of the guide unit 56 of the alignment drive unit 26.

The at least one alignment element 20, 22, 24 by means of interacting with an activation unit 40 of the alignment unit 18 is actively movable relative to the at least one motion element 28, 30, 32, said activation unit 40 particularly being configured differently from a further motion element 34, 36, 38 of the alignment drive unit 26. The activation unit 40 can comprise, for example, a groove-shaped guide track 60 which interacts with at least one cam 62, 64, 66 that is disposed on the alignment element 20, 22, 24 (cf. FIG. 3), can be configured as a separate drive unit such as, for example, a magnetic drive unit, as an electric motor drive unit, as a pneumatic drive unit, or the like which is disposed on the at least one motion element 28, 30, 32 and/or on the alignment drive unit 26, or as another activation unit that appears expedient to a person skilled in the art. The activation unit 40 is particularly preferably configured differently from a scissor-joint mechanism which for moving the alignment element 20, 22, 24 interacts with at least two motion elements 28, 30, 32, 34, 36, 38 of the alignment drive unit 26 that are particularly disposed behind one another on a common guide track 44 along the main transportation direction 16.

Figure 3:
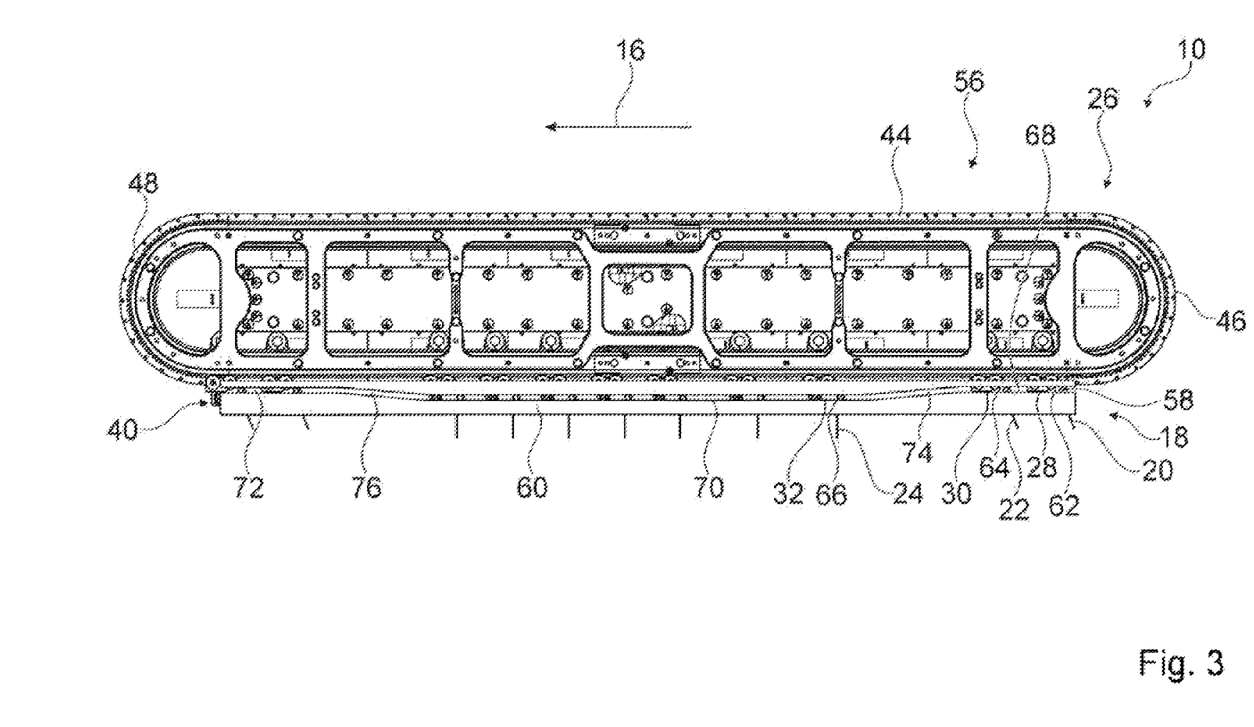
FIG. 3 shows a detailed view of an alignment drive unit and of an activation unit of an alignment unit of the device according to the invention, in a schematic illustration.

The activation unit 40 preferably comprises at least one groove-shaped guide track 60 which interacts with at least one cam 62, 64, 68 that is disposed on the at least one alignment element 20, 22, 24 and/or on the at least one motion element 28, 30, 32. However, it is also conceivable that the activation unit 40 has a web-shaped guide track which interacts with at least one cam that is disposed on the at least one alignment element 20, 22, 24 and/or on the at least one motion element 28, 30, 32. The groove-shaped guide track 60 of the activation unit 40 at least in portions preferably runs so as to be at least substantially parallel to the guide track 44 of the guide unit 56. A maximum overall extent of the groove-shaped guide track 60 of the activation unit 40 is preferably smaller than a maximum overall extent, particularly than a maximum overall profile, of the guide track 44 of the guide unit 56. The groove-shaped guide track 60 of the activation unit 40 is preferably disposed on a rectilinear section profile of the guide track 44 of the guide unit 56. The guide track 60 of the activation unit 40 is disposed on the guide track 44 of the guide unit 56 in such a manner that the at least one cam 62, 64, 66 of the activation unit 40 that is disposed on the at least one alignment element 20, 22, 24 and/or on the at least one motion element 28, 30, 32 is capable of being brought to engage temporarily with the groove-shaped guide track 60 of the activation unit 40, particularly as a function of the position of the at least one alignment element 20, 22, 24 and/or of the at least one motion element 28, 30, 32 relative to the guide track 44 of the guide unit 56.

The groove-shaped guide track 60 of the activation unit 40 preferably has at least one introduction section portion 68 by means of which the at least one cam 62, 64, 66 of the activation unit 40 that is disposed on the at least one alignment element 20, 22, 24 and/or on the at least one motion element 28, 30, 32 is capable of being introduced into the groove-shaped guide track 60 of the activation unit 40, in particular as a result of a movement of the at least one alignment element 20, 22, 24 and/or of the at least one motion element 28, 30, 32 along the guide track 44 of the guide unit 56. The groove-shaped guide track 60 of the activation unit 40 preferably has at least one alignment section portion 70 which as a result of an interaction with the at least one cam 62, 64, 66 of the activation unit 40 that is disposed on the at least one alignment element 20, 22, 24 and/or on the at least one motion element 28, 30, 32 is provided for moving the at least one alignment element 20, 22, 24, particularly for incorporating said at least one alignment element 20, 22, 24 into a gap between at least two products, and/or for holding said at least one alignment element 20, 22, 24 in deployed position in which the at least one alignment element 20, 22, 24 is provided for engaging in a gap between at least two products 14. The groove-shaped guide track 60 of the activation unit 40 preferably has at least one extraction section portion 72 by means of which the at least one cam 62, 64, 66 of the activation unit 40 that is disposed on the at least one alignment element 20, 22, 24 and/or on the at least one motion element 28, 30, 32 is capable of being extracted from the groove-shaped guide track 60 of the activation unit 40, particularly as a result of a movement of the at least one alignment element 20, 22, 24 and/or of the at least one motion element 28, 30, 32 along the guide track 44 of the guide unit 56. The extraction section portion 72 as a result of an interaction with the at least one cam 62, 64, 66 of the activation unit 40 that is disposed on the at least one alignment element 20, 22, 24 and/or on the at least one motion element 28, 30, 32 is particularly provided for moving the at least one alignment element 20, 22, 24, particularly in a direction of an initial position and/or in the direction of the at least one motion element 28, 30, 32, particularly for a movement away from the transport device 12.

The alignment section portion 70 along the main transportation direction 16 is preferably disposed between the introduction section portion 68 and the extraction section portion 72. The alignment section portion 70 along a direction that runs so as to be at least substantially perpendicular to the main transportation direction 16 has a largest spacing from the guide track 44 of the guide unit 56 than the introduction section portion 68 and/or the extraction section portion 72. The alignment section portion 70 along a direction that runs so as to be at least substantially perpendicular to the main transportation direction 16 preferably has a smaller spacing from the transport device 12 than the introduction section portion 68 and/or the extraction section portion 72. In a transition region 74, 76 of the groove-shaped guide track 60 of the activation unit 40, between the alignment section portion 70 and the introduction section portion 68 and/or the extraction section portion 72, the groove-shaped guide track 60 of the activation unit 40 runs transversely to the main transportation direction 16, particularly for enabling a movement of the at least one alignment element 20, 22, 24 in the direction of the transport device 12 in the transition region 74, 76 between the alignment section portion 70 and the introduction section portion 68 and/or for enabling a movement of the at least one alignment element 20, 22, 24 away from the transport device 12 in the transition region 74, 76 between the alignment section portion 70 and the extraction section portion 72. The groove-shaped guide track 60 of the activation unit 40 is disposed on the device 10, particularly on the guide unit 56 on a side of the device 10, particularly of the guide unit 56, that faces the transport device 12. Alternatively or additionally, it is also conceivable that the activation unit 40 has at least one individually actuatable drive unit such as, for example, an electric motor unit, a magnetic drive unit, or the like, which is provided for moving the at least one alignment element 20, 22, 24 relative to the at least one motion element 28, 30, 32, particularly for moving the at least one alignment element 20, 22, 24 into or out of a gap between at least two products 14, particularly in a manner largely independent of any movement of the at least one motion element 28, 30, 32 along the guide track 44 of the guide unit 56.

The device 10 comprises at least one sensor unit 42 at least for detecting at least one gap that exists between at least two of the products 14, wherein the at least one alignment element 20, 22, 24 and/or the at least one motion element 28, 30, 32 are/is movable as a function of the detected gap. The device 10 preferably comprises at least one controlling and/or regulating unit 78 which is provided for controlling and/or regulating a movement of the at least one motion element 28, 30, 32 and/or of the at least one alignment element 20, 22, 24 as a function of a gap between at least two of the products 14 that is detected by means of the sensor unit 42. The at least one alignment element 20, 22, 24 is preferably movable into the gap as a result of a detection of a gap between at least two of the products 14. A movement of the at least one alignment element 20, 22, 24 into a gap in the absence of a detection of a gap between at least two of the products 14 is preferably capable of being suppressed by means of the controlling and/or regulating unit 78.

The at least one alignment element 20, 22, 24, particularly each alignment element 20, 22, 24, of the alignment unit 18 is preferably assigned fewer than four, particularly at most two, motion elements 28, 30, 32, 34, 36, 38 of the alignment drive unit 26. The at least one alignment element 20, 22, 24 by way of at least one end is preferably connected to the at least one, particularly only to the one, motion element 28, 30, 32, is particularly mounted so as to be movable on the at least one motion element 28, 30, 32. The at least one alignment element 20, 22, 24 by way of at least one further end is particularly connected to at least one further, particularly only to the one further, motion element 34, 36, 38, is particularly mounted so as to be movable on the at least one motion element 28, 30, 32. The at least one motion element 28, 30, 32 and the at least one further motion element 34, 36, 38 conjointly form a motion element pair of the alignment drive unit 26 by means of which the at least one alignment element 20, 22, 24 is movable along the guide tracks 44 of the guide unit 56, is particularly capable of being moved in an individually speed-regulated and/or position-regulated manner. The at least one alignment element 20, 22, 24 is preferably mounted on the at least one motion element 28, 30, 32 and/or on the at least one further motion element 34, 36, 38 so as to be movable in a translatory and/or rotary, particularly pivotable, manner. The at least one alignment element 20, 22, 24 is particularly mounted on the motion element pair of the alignment drive unit 26 so as to be movable in a translatory and/or rotary, particularly pivotable, manner. The alignment unit 18 preferably comprises a multiplicity of alignment elements 20, 22, 24 which are in each case mounted so as to be movable on a motion element pair of the alignment drive unit 26 (cf. FIGS. 6 and 7). The alignment drive unit 26 particularly comprises a multiplicity of motion elements 28, 30, 32 and/or further motion elements 34, 36, 38 for moving the multiplicity of alignment elements 20, 22, 24 along the guide tracks 44. One of the motion elements 28, 30, 32 and one of the further motion elements 34, 36, 38 particularly preferably configure in each case one motion element pair of the alignment drive unit 26 for moving a single alignment element 20, 22, 24 along the guide tracks 44. A linear motor system of the alignment drive unit 26 for moving the motion elements 28, 30, 32, 34, 36, 38 is preferably disposed on each of the guide tracks 44. The linear motor systems preferably have a design embodiment that is already known to a person skilled in the art.

A movement of the at least one motion element 28, 30, 32 and of the at least one further motion element 34, 36, 38 along the guide tracks 44 is capable of being controlled and/or regulated, particularly synchronized, by means of the controlling and/or regulating unit 78. The at least one motion element 28, 30, 32 is movably mounted on one of the two guide tracks 44, particularly disposed so as to be capable of being driven individually in a speed-regulated and/or position-regulated manner on one of the two guide tracks 44. The at least one further motion element 34, 36, 38 is movably mounted on a further of the two guide tracks 44, in particular disposed to as to be capable of being driven individually in a speed-regulated and/or position-regulated manner on a further of the two guide tracks 44. The two guide tracks 44 are disposed so as to be at least substantially mutually parallel. The movement planes of the motion elements 28, 30, 32, 34, 36, 38 defined by a profile of the guide tracks 44 preferably run so as to be at least substantially parallel to the main transportation direction 16. The movement planes of the motion elements 28, 30, 32, 34, 36, 38 defined by a profile of the guide tracks 44 preferably run so as to be at least substantially perpendicular to a transport face of the transport device 12. The two guide tracks 44 are preferably connected to one another at least by means of the at least one alignment element 20, 22, 24. The at least one alignment element 20, 22, 24 at least in part preferably spans the transport device 12, particularly along a direction that runs so as to be at least substantially perpendicular to the main transportation direction 16 and/or so as to be at least substantially perpendicular to the movement plane of the at least one motion element 28, 30, 32 and/or of the at least one further motion element 34, 36, 38.

Figure 7:
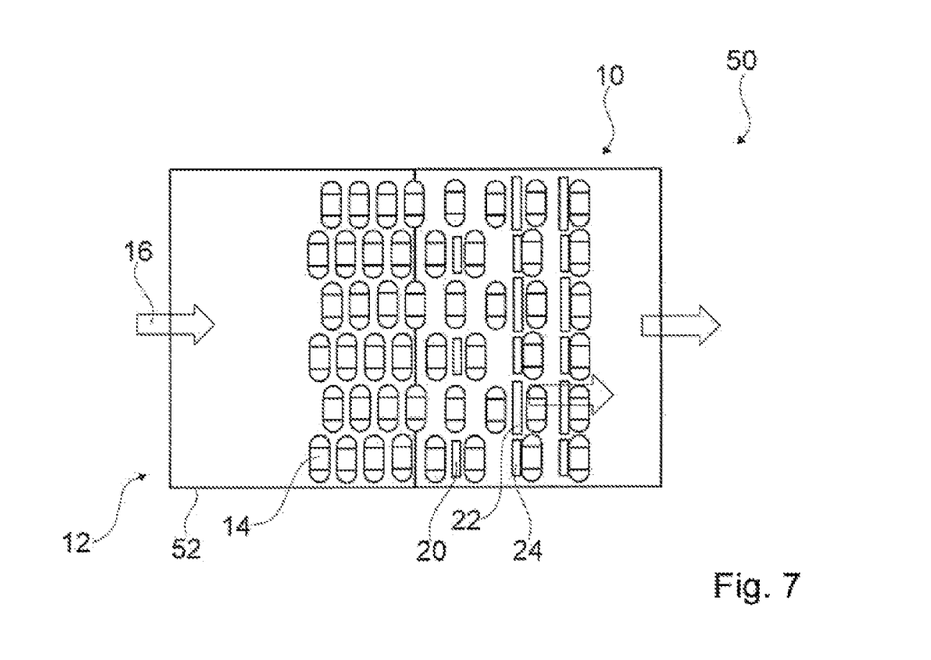
FIG. 7 shows a plan view of a disorganized product carpet, wherein rows are capable of being formed by means of incorporating alignment elements of the alignment unit of the device according to the invention, in a schematic illustration.

Alternatively or additionally, it is conceivable that the alignment unit 18 has a multiplicity of alignment elements 20, 22, 24 which are disposed so as to be movable on the at least one motion element 28, 30, 32 (cf. FIG. 7). It is conceivable that each motion element pair of the alignment drive unit 26 is assigned a multiplicity of alignment elements 20, 22, 24, that each a disposal of an individual alignment element 20, 22, 24 on a motion element pair of the alignment drive unit 26 and the disposal of a multiplicity of alignment elements 20, 22, 24 on motion element pair of the alignment drive unit 26 on the guide unit 56 is performed so as to be uniformly distributed or non-uniformly distributed such as, for example, in an alternating manner, chaotic manner, or the like, or that each motion element pair of the alignment drive unit 26 is assigned only a single alignment element 20, 22, 24. In the case of the disposal of a multiplicity of alignment elements 20, 22, 24 on a motion element pair of the alignment drive unit 26 it is conceivable that the alignment elements 20, 22, 24 that are disposed on the at least one motion element 28, 30, 32 are capable of being moved individually and/or collectively. It is conceivable that the activation unit 40, alternatively or additionally to the groove-shaped guide track 60 and the cams 62, 64, 66, has at least one individual drive unit which is provided for individually driving each single alignment element 20, 22, 24 of the multiplicity of alignment elements 20, 22, 24 which are disposed on a motion element pair of the alignment drive unit 26. However, it is also conceivable that the activation unit 40, alternatively or additionally to the groove-shaped guide track 60 and the cam 62, 64, 66, has at least one individual drive unit which is provided for individually driving groups of alignment elements 20, 22, 24 of the multiplicity of alignment elements 20, 22, 24 which are disposed on a motion element pair of the alignment drive unit 26. In the case of a disposal of a multiplicity of alignment elements 20, 22, 24 on the motion element pair of the alignment drive unit 26 it is conceivable that the alignment elements 20, 22, 24 are disposed behind one another so as to be at least substantially parallel to the main transportation direction 16 and/or are disposed beside one another, so as to be transverse, particularly so as to be at least substantially perpendicular, to the main transport direction 16. Further design embodiments and/or disposals of a multiplicity of alignment elements 20, 22, 24 on the at least one motion element 28, 30, 32 and/or on the at least one further motion element 34, 36, 38, which appear expedient to a person skilled in the art, particularly those which conjointly form a motion element pair of the alignment drive unit 26 are likewise conceivable.

Figure 4:
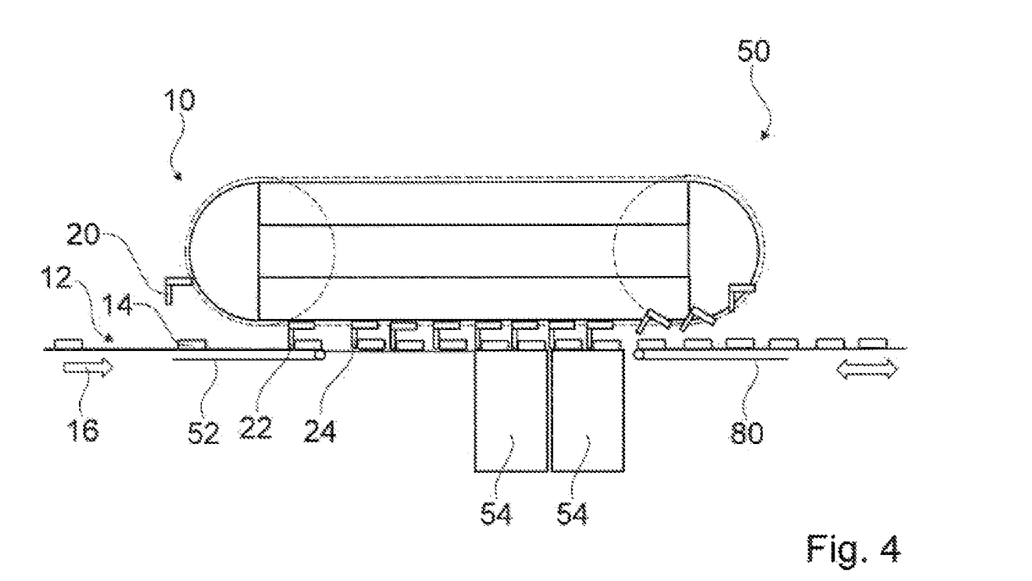
FIG. 4 shows a potential row formation function from a disorganized product carpet by means of the device according to the invention, in a schematic illustration.
Figure 5:
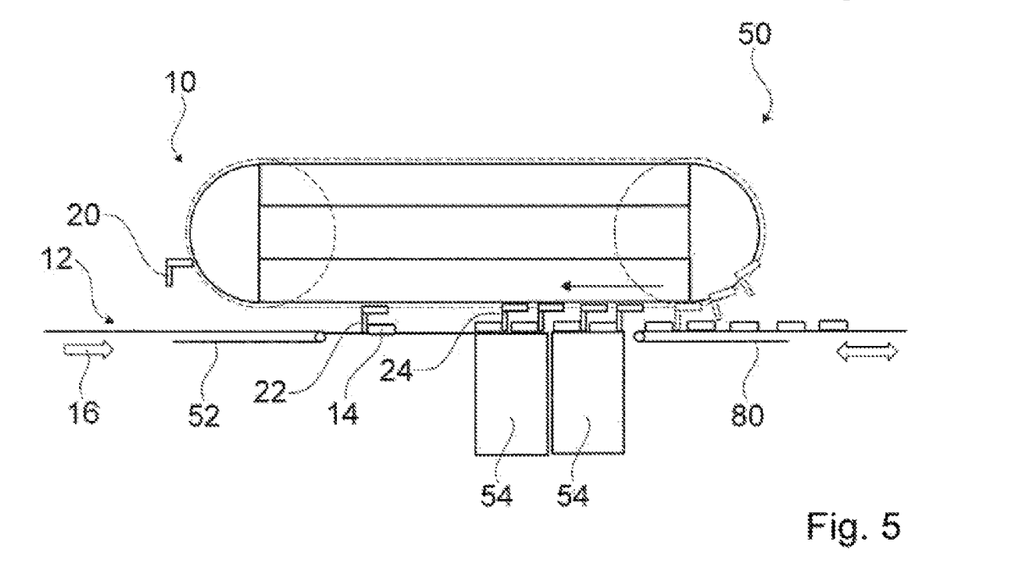
FIG. 5 shows a further potential row formation function from a disorganized product carpet by means of the device according to the invention, in a schematic illustration.

In the case of a method for aligning products 14, particularly for forming from products 14 rows and/or groups that run transversely to the main transportation direction 16 by means of the device 10, in at least one method step for moving at least one alignment element 20, 22, 24 of the alignment unit 18 into a gap that exists between at least two of the products 14 the at least one alignment element 20, 22, 24 by means of interacting with an activation unit 40 is actively moved relative to at least one motion element 28, 30, 32 of the alignment drive unit 26, said activation unit 40 being particularly configured so as to be different from a further motion element 34, 36, 38 of the alignment drive unit 26 (cf. FIGS. 4 to 8), or the at least one alignment element 20, 22, 24, as a function of a movement of the at least one motion element 28, 30, 32 and/or of the at least one further motion element 34, 36, 38, particularly of at least one motion element pair of the alignment drive unit 26, along the arc 46 of the guide track 44 of the alignment drive unit 26, is moved into the gap that exists between at least two of the products 14, particularly in the case of an alternative design embodiment in which the at least one alignment element 20, 22, 24 is disposed so as to be at least substantially immovable on the at least one motion element 28, 30, 32 and/or on the at least one further motion element 34, 36, 38, particularly on at least one motion element pair of the alignment drive unit 26 (cf. FIG. 5). In at least one method step the at least one gap that exists between at least two of the products 14 is preferably detected by means of the at least one sensor unit 42. In at least one method step the at least one alignment element 20, 22, 24 and/or the at least one motion element 28, 30, 32, particularly the at least one motion element pair of the alignment drive unit 26, are/is moved as a function of the detected gap.

FIG. 4 shows a potential row formation function from a disorganized product carpet from products 14 by means of the device 10. In at least one method step the disorganized products 14 by means of the supply unit 52 are moved along the main transportation direction 16, particularly supplied to the device 10. In at least one method step the products 14 are aligned by means of the at least one alignment element 20, 22, 24, wherein a movement of the products 14 along the main transportation direction 16 can be performed by the at least one alignment element 20, 22, 24 and/or by the supply unit 52. The aligned products 14 in at least one method step are supplied to a reversing transport unit 80 of the transport device 12 and/or to the discharge unit 54, particularly at least one discharge unit 54 that is configured as a transverse discharge unit. It is also conceivable that the transport device 12 has a number of discharge units 54 deviating from one, said discharge units 54 being configured as transverse discharge units or having another design embodiment. In at least one method step the products 14 by means of the discharge unit 54 are discharged from the device 10 and/or supply to a packaging process or the like. The reversing transport unit 80 is particularly provided as a buffer by means of which aligned products 14, particularly products 14 that are aligned in rows and/or groups, are capable of being temporarily stored until onward transportation.

FIG. 5 shows a further potential row formation function from a disorganized product carpet of products 14 by means of the device 10, wherein in at least one method step the aligned products 14 by means of the at least one alignment element 20, 22, 24 are moved counter to the main transportation direction 16, particularly for displacing aligned products 14 from the reversing transport unit 80 to the discharge unit 54 and/or from one of the discharge units 54 to the further of the discharge units 54.

Alternatively to the potential row formation functions by means of the device 10 shown and described in the exemplary manner in FIGS. 4 and 5, particularly alternatively to the supply unit 52 that is configured as a transport belt, for example, it is conceivable that the products 14 are supplied to the transport device 12 by means of the plate supply unit (not illustrated in more detail here). The plate supply unit could preferably be provided for supplying products 14, in particular in the form of cast chocolate products in an at least partially aligned manner, particularly caused by a casted production of the cast chocolate products in molds, to the device 10. The plate supply unit is preferably provided for supplying the products 14 to the device 10 along a direction that runs so as to be transverse, particularly so as to be substantially perpendicular, to the main transportation direction 16, particularly along a direction that runs so as to be at least substantially perpendicular to a floor mounting face of the transport device 12. The device 10 by means of the alignment elements 20, 22, 24 can acquire the products 14 from the plate supply unit, align said products 14, and supply said products 14 to at least one of the discharge units 54 or to the reversing transport unit 80. It would also be conceivable that the products 14 after delivery by the supply unit 52 are aligned by means of the device 10 and are supplied to at least one plate supply unit for outward transportation (the plate supply unit could be disposed in the position of the discharge units 54 illustrated in FIGS. 4 and 5, for example). Buffering of products 14 by means of the plate supply unit which could be provided alternatively to the discharge units 54 is also conceivable. It would moreover also be conceivable that products by means of the plate supply unit, additionally to the supply unit 52, are streamed into a transport process. Further design embodiments of the transport device 12, with or without a plate supply unit, that appear expedient to a person skilled in the art are likewise conceivable.

Figure 6:
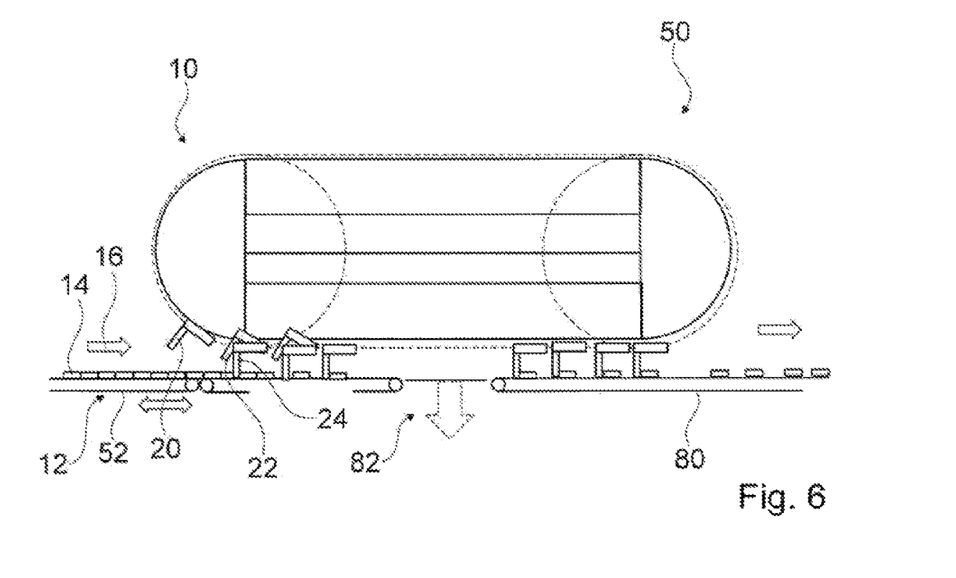
FIG. 6 shows a further potential row formation function from a disorganized product carpet by means of the device according to the invention, in a schematic illustration.
Figure 8:
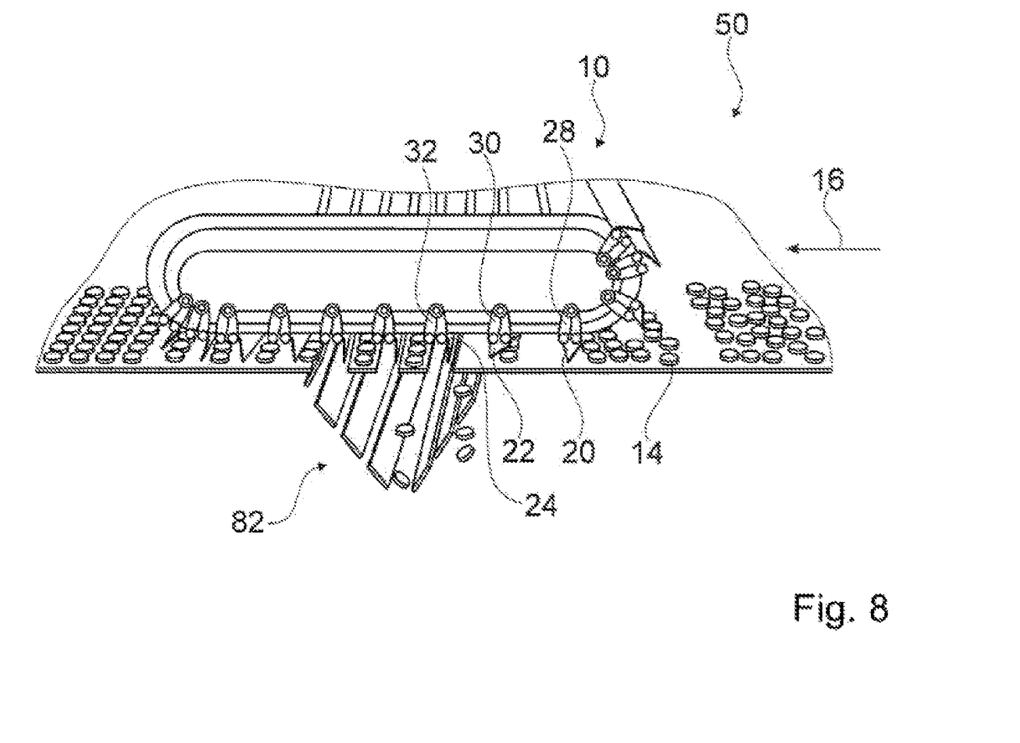
FIG. 8 shows a detailed view of the device according to the invention when interacting with a sorting unit of the production and/or packaging machine, a schematic illustration.

FIGS. 6 and 8 show a further potential row formation function from a disorganized product carpet of products 14 by means of the device 10, wherein in at least one method step non-aligned products 14 or defective products 14 are capable of being sorted out by means of the device 10 and/or the transport device 12, in particular as a result of being supplied to an ejection unit 82 of the transport device 12 which is preferably disposed below the device 10.

FIG. 7 shows a further potential row formation function from a disorganized product carpet of products 14 by means of the device 10, wherein in at least one method step in the case of the disposal of a multiplicity of alignment elements 20, 22, 24 on a single motion element pair of the alignment drive unit 26 an alignment of individual products 14 disposed in a row is performed with further products 14 disposed in a row. The individual alignment elements 20, 22, 24 which are disposed on a single motion element pair of the alignment drive unit 26 are capable of being individually moved relative to one another.

In terms of further method steps of the method for aligning products 14 by means of the device 10 reference may be made to the preceding description of the device 10 since this description can be applied in analogous manner to the method and thus all features in terms of the device 10 are considered disclosed also with reference to the method for aligning products 14 by means of the device 10, and vice versa.

What is claimed is:

1. A device for aligning products (14), the device comprising at least one alignment unit (18) which has at least one alignment element (20, 22, 24) that is, for aligning the products (14), configured to be incorporated in a gap that exists between at least two of the products (14), the device also comprising at least one alignment drive unit (26), the alignment drive unit (26) being a linear motor system, which at least for driving the at least one alignment element (20, 22, 24) has at least one motion element (28, 30, 32) which is configured to be individually driven in a speed-regulated and/or position-regulated manner and on which the at least one alignment element (20, 22, 24) is disposed, wherein the at least one alignment element (20, 22, 24), by interacting with an activation unit (40) of the alignment unit (18), is actively movable relative to the at least one motion element (28, 30, 32), the device further comprising at least one sensor unit (42) at least for detecting at least one gap that exists between at least two of the products (14), wherein the at least one alignment element (20, 22, 24) and/or the at least one motion element (28, 30, 32) is/are movable as a function of the detected gap, wherein the at least one alignment element (20, 22, 24) of the alignment unit (18) is assigned fewer than four motion elements (28, 30, 32, 34, 36, 38) of the alignment drive unit (26).

2. The device as claimed in claim 1, characterized in that the at least one alignment element (20, 22, 24) is mounted on the at least one motion element (28, 30, 32) so as to be movable in a translatory and/or rotary manner.

3. The device as claimed in claim 1, characterized in that the alignment unit (18) has a multiplicity of alignment elements (20, 22, 24) which are disposed so as to be movable on the at least one motion element (28, 30, 32).

4. The device as claimed in claim 3, characterized in that the alignment elements (20, 22, 24) that are disposed on the at least one motion element (28, 30, 32) are capable of being moved individually and/or collectively.

5. The device as claimed in claim 1, characterized in that the alignment drive unit (26) has at least one, guide track (44) which has at least one arc (46, 48), wherein the at least one alignment element (20, 22, 24) as a function of a movement of the at least one motion element (28, 30, 32) along the arc (46, 48) is configured to be incorporated into the gap that exists between at least two of the products (14).

6. A method for aligning products (14) with the device as claimed in claim 1, wherein, in at least one method step for moving the at least one alignment element (20, 22, 24) of the alignment unit (18) into a gap that exists between at least two of the products (14), the at least one alignment element (20, 22, 24), by interacting with the activation unit (40), is actively moved relative to the at least one motion element (28, 30, 32) of the alignment drive unit (26).

7. The method as claimed in claim 6, characterized in that in at least one method step the at least one gap that exists between at least two of the products (14; 14) is detected by means of the at least one sensor unit (42).

8. The method as claimed in claim 7, characterized in that in at least one method step the at least one alignment element (20, 22, 24) and/or or the at least one motion element (28, 30, 32) are/is moved as a function of the detected gap.

9. The device as claimed in claim 1, wherein said activation unit (40) is configured so as to be different from a further motion element (34, 36, 38) of the alignment drive unit (26).

10. The device as claimed in claim 1, wherein said activation unit (40) is disposed so as to be at least substantially immovable on the at least one motion element (28, 30, 32).

11. The device as claimed in claim 1, characterized in that each alignment element (20, 22, 24), of the alignment unit (18) is assigned at most two motion elements (28, 30, 32, 34, 36, 38) of the alignment drive unit (26).

12. The device as claimed in claim 1, characterized in that the alignment drive unit (26) has at least one continuous guide track (44) which has at least one arc (46, 48), wherein the at least one alignment element (20, 22, 24) as a function of a movement of the at least one motion element (28, 30, 32) along the arc (46, 48) is configured to be incorporated into the gap that exists between at least two of the products (14).

13. A device for forming, from products (14) that are moved by means of a transport device (12), rows and/or groups that run transversely to a main transportation direction (16) of the transport device (12), the device comprising at least one alignment unit (18) which has at least one alignment element (20, 22, 24) that is, for aligning the products (14), configured to be incorporated in a gap that exists along the main transportation direction (16) between at least two of the products (14), the device also comprising at least one alignment drive unit (26), the alignment drive unit (26) being a linear motor system, which at least for driving the at least one alignment element (20, 22, 24) has at least one motion element (28, 30, 32) which is configured to be individually driven in a speed-regulated and/or position-regulated manner and on which the at least one alignment element (20, 22, 24) is disposed, the device further comprising at least one sensor unit (42) at least for detecting at least one gap that exists between at least two of the products (14), wherein the at least one alignment element (20, 22, 24) and/or the at least one motion element (28, 30, 32) is/are movable as a function of the detected gap, wherein the at least one alignment element (20, 22, 24), by interacting with an activation unit (40) of the alignment unit (18), is actively movable relative to the at least one motion element (28, 30, 32), said activation unit (40) being configured so as to be different from a further motion element (34, 36, 38) of the alignment drive unit (26), or being disposed so as to be at least substantially immovable on the at least one motion element (28, 30, 32).

14. A method for forming from products (14) rows and/or groups that run transversely to a main transportation direction (16), by means of a device as claimed in claim 1, characterized in that in at least one method step for moving at least one alignment element (20, 22, 24) of an alignment unit (18) into a gap that exists between at least two of the products (14) the at least one alignment element (20, 22, 24), by interacting with an activation unit (40), is actively moved relative to at least one motion element (28, 30, 32) of the alignment drive unit (26), said activation unit (40) being configured so as to be different from a further motion element (34, 36, 38) of the alignment drive unit (26), or the at least one alignment element (20, 22, 24), as a function of a movement of the at least one motion element (28, 30, 32) along an arc (46, 48) of a guide track (44) of the alignment drive unit (26), is moved into the gap that exists between at least two of the products (14).

15. The device as claimed in claim 13, characterized in that the at least one alignment element (20, 22, 24) of the alignment unit (18) is assigned fewer than four motion elements (28, 30, 32, 34, 36, 38) of the alignment drive unit (26).

16. The device as claimed in claim 13, characterized in that the alignment unit (18) has a multiplicity of alignment elements (20, 22, 24) which are disposed so as to be movable on the at least one motion element (28, 30, 32), wherein the alignment elements (20, 22, 24) that are disposed on the at least one motion element (28, 30, 32) are capable of being moved individually and/or collectively.

17. The device as claimed in claim 15, characterized in that the alignment unit (18) has a multiplicity of alignment elements (20, 22, 24) which are disposed so as to be movable on the at least one motion element (28, 30, 32), wherein the alignment elements (20, 22, 24) that are disposed on the at least one motion element (28, 30, 32) are capable of being moved individually and/or collectively.

18. A device for forming, from products (14) that are moved by means of a transport device (12), rows and/or groups that run transversely to a main transportation direction (16) of the transport device (12), the device comprising at least one alignment unit (18) which has at least one alignment element (20, 22, 24) that is, for aligning the products (14), configured to be incorporated in a gap that exists along the main transportation direction (16) between at least two of the products (14), the device also comprising at least one alignment drive unit (26), the alignment drive unit (26) being a linear motor system, which at least for driving the at least one alignment element (20, 22, 24) has at least one motion element (28, 30, 32) which is configured to be individually driven in a speed-regulated and/or position-regulated manner and on which the at least one alignment element (20, 22, 24) is disposed, wherein the at least one alignment element (20, 22, 24) being disposed so as to be at least substantially immovable on the at least one motion element (28, 30, 32), the device further comprising at least one sensor unit (42) at least for detecting at least one gap that exists between at least two of the products (14), wherein the at least one alignment element (20, 22, 24)

and/or the at least one motion element (28, 30, 32) is/are movable as a function of the detected gap, wherein the alignment drive unit (26) has at least one guide track (44) which has at least one arc (46, 48), wherein the at least one alignment element (20, 22, 24) as a function of a movement of the at least one motion element (28, 30, 32) along the arc (46, 48) is configured to be incorporated into the gap that exists between at least two of the products (14).

* * * * *